United States Patent [19]

Orlando

[11] 4,028,612

[45] June 7, 1977

[54] DYNAMIC CURRENT LIMITER FOR SWITCHING VOLTAGE REGULATORS

[75] Inventor: Luciano Orlando, Milan, Italy

[73] Assignee: Honeywell Information Systems Italia, Caluso, Italy

[22] Filed: Sept. 3, 1976

[21] Appl. No.: 720,151

[30] Foreign Application Priority Data

Sept. 10, 1975 Italy .................................. 27059/75

[52] U.S. Cl. ..................................... 323/17; 321/2; 323/9; 323/DIG. 1
[51] Int. Cl.² .......................................... G05F 1/56
[58] Field of Search .......... 323/9, 17, 22 T, DIG. 1; 321/2

[56] References Cited

UNITED STATES PATENTS

| | | | |
|---|---|---|---|
| 3,599,083 | 10/1971 | Bugge-Asperheim | 323/22 T |
| 3,629,662 | 12/1971 | Denenberg, Jr. | 323/DIG. 1 |
| 3,641,424 | 2/1972 | Kuvkendall | 323/17 |
| 3,931,566 | 1/1976 | Pask et al. | 323/DIG. 1 |

*Primary Examiner*—Gerald Goldberg
*Attorney, Agent, or Firm*—Schiller & Pandiscio

[57] ABSTRACT

A dynamic current limiting circuit to be used in connection with voltage regulators of the switching type is provided. The current limiter consists of electronic means suitably connected into the power stage of a conventional switching voltage regulator, for the purpose of reducing or removing the detrimental peak current spikes which occur whenever the power transistor switches from the non-conducting to the conducting state.

2 Claims, 3 Drawing Figures

DYNAMIC CURRENT LIMITER FOR SWITCHING VOLTAGE REGULATORS

BACKGROUND OF THE INVENTION

The present invention relates in general to a new and improved voltage regulator and more particularly to the power stage of a switching type power supply wherein the output voltage is obtained by opening and closing a power switching device, generally consisting of a semiconductor element. Regulated DC power supplies are known wherein a semiconductor element opens and closes the feeding circuit during consecutive time intervals. The ratio between the open and closed intervals determines the quantity of energy which is transferred during a unit time interval from a non-stabilized DC energy source to the output terminal in the form of a direct current at constant voltage.

The typical power stage of a stabilized voltage regulator, known to those skilled in the art, comprises at least a power transistor used as a switching device. The transistor, e.g. of the NPN type, has its collector connected to the positive terminal of a non-regulated voltage source, while its emitter is connected to the cathode of a commutating diode, also known as a "free wheeling" or "catch" diode. The anode of the aforesaid diode is connected to the negative terminal of the voltage source. A filter is connected in parallel with this diode comprising an inductance and a capacitor and the lead is coupled to the filter output. The base of the power switching transistor is triggered by an appropriate driving circuit.

In a circuit of the type described, the switching transistor is driven alternately to the conducting state (ON state) and to the non-conducting state (OFF state) by the output signal of the pulse type driving circuit applied to its base. Depending on the state of the switching transistor, it either passes or fails to pass current to the inductance. The function of the commutating, or catch, diode is to provide current to the inductance during the time interval when the switching transistor is in the OFF state. Thus, the current "commutates" between the transistor and the catch diode and its value is given by the average value between the minimum current flowing through the filter inductance corresponding to the rising edge of the driving pulse. The maximum current flowing in the inductance corresponds to the trailing edge of the driving pulse.

In a circuit configuration of the type described, high amplitude current spikes occur corresponding to each transition of the switching transistor from the non-conducting state to the conducting state. These spikes are due to the fact that the diode is a non-ideal element with respect to switching speed or reverse recovery.

In fact the diode, like all PN junction diodes, exhibits a phenomenon known as "minority carrier sweepout," such that after forward conduction, the reverse biased diode essentially constitutes a short circuit for a period of time TR, known as the recovery time. It follows, that during this period of time current spikes of high amplitude occur at the switching transistor and these are superimposed on the D.C. current supplied by the transistor. The peak currents, which occur during the recovery time TR of the catch diode, can reach very high values, e.g. up to five times the average forward current value.

In a voltage regulator of the type described, the existence of excessive spikes is subject to a number of disadvantages:

a. The switching transistor must pass excessive currents, although only for finite periods of time. As a result, the transistor may be overstressed so as to cause a malfunction to occur, or to shorten its useful life.

b. The excessive short circuit current may upset the primary power supply of the circuit and cause noise in the rest of the system.

c. The efficiency of the switching regulator decreases with an increase in the frequency, as the interval during which excessive current flows becomes a significant portion of the transistor ON time.

The above-mentioned disadvantages are typical of known voltage regulators wherein the power switching transistor is driven by a suitable pulse signal and wherein the diode acts as a catch diode to provide current to the inductance when the transistor is in the non-conducting state.

SUMMARY OF THE INVENTION

It is the primary object of the present invention to obviate the foregoing disadvantages by providing a dynamic current limiting circuit which is not subject to the foregoing disadvantages.

In accordance with the principles of the present invention, a feed-back transistor and a feed-back inductor of suitable value are provided, appropriately connected between the power transistor and the catch diode. The function of these components is to decrease or to remove entirely the peak currents or spikes which occur whenever the power transistor switches from the OFF state to the OR state, by suitably controlling the base current of said transistor.

This dynamic type of control acts in a way such that, instant by instant, a base current is delivered to the power switching transistor. The latter saturates with the linear variations of current versus time, such that the peak current, which corresponds to the recovery time of the catch diode, has a maximum value that is not excessive.

The excess of the base current delivered by the driving circuit is subtracted by the feed-back transistor which operates whenever the voltage of the inductor terminals, (which is equal to the product of the derivative of the current that flows through it with respect to time and the value of the inductance itself), is such as to exceed the conduction threshold VBE of said transistor.

Therefore, the circuit which is the subject of the present invention comprises a feed-back switching transistor and a feed-back inductance of suitable value, which permits the power stage of a voltage regulator to be defined in a way as to obtain a controlled rising edge of the current when the power transistor switches from the OFF state to the ON state.

These and other features and advantages of the invention will become apparent from the following detailed description of a preferred embodiment when considered in conjunction with the attached drawings.

DETAILED DESCRIPTION OF THE PREFERRED EMBODIMENT

Figure 1:
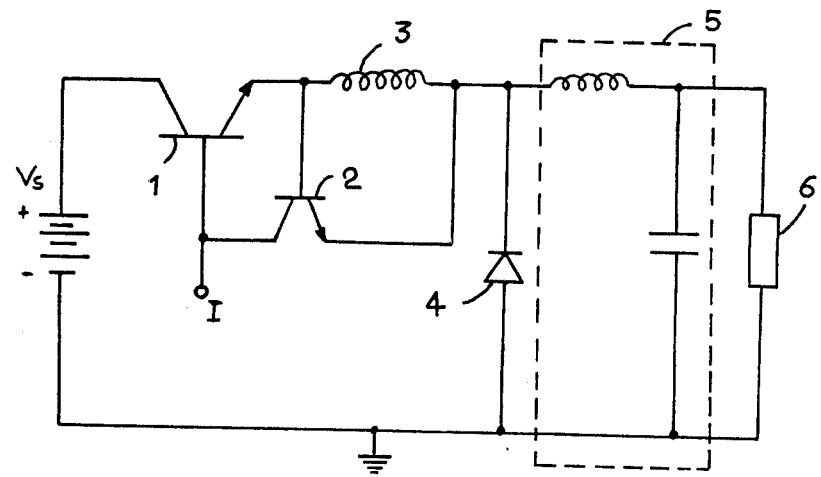
FIG. 1 illustrates a preferred embodiment of the switching regulator which forms the subject matter of the present invention.

FIG. 1 illustrates in schematic diagram form the voltage regulator of the present invention, including a dynamic current limiting circuit and the elements thereof. Reference numeral 1 designates the power switching transistor used for the regulation function. This transistor, for instance of the NPN type, has its collector connected to the positive terminal of a non-regulated voltage source $+V_s$ and its emitter connected to the base of the feed-back switching transistor 2, which may also be of the NPN type. This last transistor also has its collector connected to the base of transistor 1 and is thus connected in parallel to the base-emitter junction of transistor 1.

An inductance 3 is connected between the base and the emitter of transistor 2. The value of inductance 3 is appropriately selected such that, together with transistor 2, it constitutes the dynamic current control device in accordance with the principles of the present invention.

The cathode of a catch diode 4 is connected to the emitter of feed-back transistor 2, while the anode of the aforesaid diode is connected to the negative terminal of the voltage source $V_s$. The circuit is completed by means of a filter 5, comprising an inductance and a capacitor, connected in parallel to diode 4. A load 6 is connected to the output of the filter 5. The power switching transistor 1 is driven from an appropriate pulse source, designated by the terminal I connected to the base of transistor 1.

Figure 2:
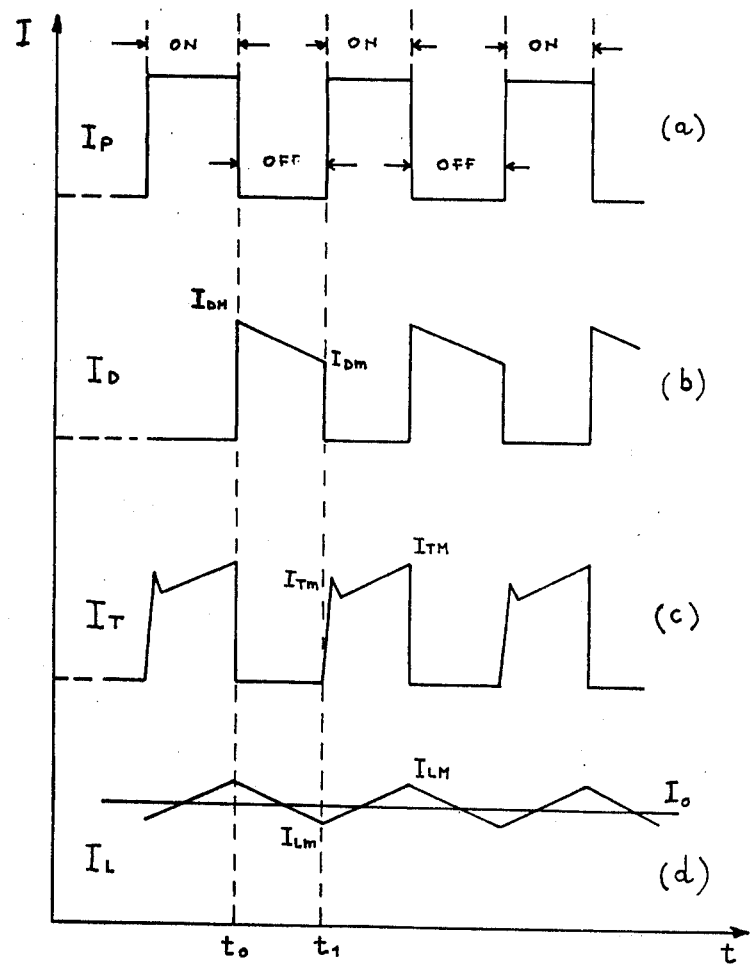
FIG. 2 illustrates certain current waveforms taken at different points of the circuit.

FIG. 2 illustrates certain current waveforms which occur at various points in the circuit of FIG. 1. Specifically, waveform (a) shows driving current $I_p$ applied by the pulse generator to the input terminal I. The terms ON and OFF indicate the occurrence and the non-occurrence, respectively, of the pulses, i.e. the conducting period and the non-conducting period respectively, of switching transistor 1.

The waveform illustrated at (b) shows the behavior of current $I_D$ which flows through the catch diode 4. The value of the latter current varies between a maximum value $I_{DM}$ and a minimum value $I_{Dm}$. The former occurs at all points in time designated $t_o$. The latter each correspond to the end of conduction of transistor 1 and the beginning of conduction of diode 4. The minimum value $I_{Dm}$ occurs at all points in time $t_1$ which correspond to the end of conduction of diode 4 and the beginning of conduction of transistor 1.

The waveform illustrated at (c) shows the behavior of current $I_T$ which flows through power transistor 1. The value of the latter current varies between a minimum value $I_{Tm}$ at instant $t_1$ and a maximum value $I_{TM}$ at instant $t_o$.

The waveforms illustrated at (d) show the behavior of current $I_L$ which flows through the filter inductance. The value of current $I_L$ varies between a minimum value $I_{Lm}$ at instant $t_1$ and a maximum value at instant $t_o$. Waveform $I_o$ represents the value of the output current which is given by the average value of the currents $I_{LM}$ and $I_{Lm}$.

With reference to FIGS. 1 and 2, the operation of the circuit will now be explained. In the steady state condition, pulse current $I_p$ is applied to the base of transistor 1. As shown, $I_p$ consists of a train of rectangular pulses supplied by a suitable source. The presence or absence of the aforesaid current pulses at the base of transistor 1 determines respectively the conductive or non-conductive state of said transistor.

Let it be assumed that instant $t_o$ coincides with the moment in time at which no current pulse is applied to the base of the transistor 1. Thus, transistor 1 is non-conducting or blocked. There is therefore no flow of current $I_T$ through the transistor and hence no current flow through filter 5 and load 6.

However, if catch diode 4 is conducting, the inductance of filter 5 will discharge the energy stored in the previous cycle so as to supply to filter 5 a current $I_D$ for the entire period in which transistor 1 remains non-conducting. The value of output current $I_o$ in the latter case is given by the average value between a maximum and a minimum, corresponding to all the instants of time $t_o$ and $t_1$.

If immediately following time $t_o$ a current pulse is applied to the base of transistor 1, the transistor goes into its conductive state and saturates. A current $I_t$ will begin to flow through transistor 1. The rising edge of said current is controlled dynamically by the feed-back circuit which comprises auxiliary switching transistor 2 and auxiliary inductance 3.

The aforesaid control function acts to limit to the desired ratio the current peak which would occur during the recovery time TR of the catch diode. As previously described, it thus prevents the removal of the minority carriers from taking place suddenly and thereby makes possible the control of this phenomenon in a gradual manner with respect to time.

The transistor 2 acts as control element of the pulse type current applied to the base of the transistor 1. As such, it limits the latter current to a value which depends on the value of inductance 3, as will appear more clearly from the discussion below with reference to FIG. 3.

Figure 3:
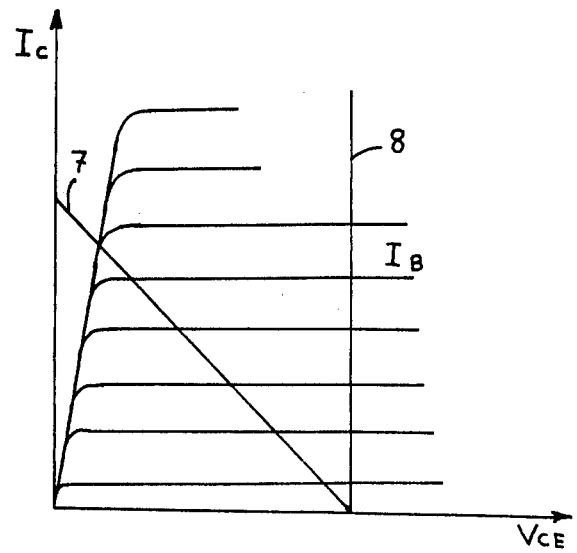
FIG. 3 illustrates the characteristic curves of a transistor.

FIG. 3 shows the characteristic curves of a transistor, illustrating the correlation between the collector current, the collector emitter voltage and the base current. As is well known, for a pre-established base current the real operating conditions are determined by the intersection of the curve corresponding to such base current with the load line. In case of a resistive load, the incline of the load line is as shown by line 7, the slope depending on the load resistance. If the load resistance is zero, the load line is essentially represented by vertical line 8.

Considering now the circuit of FIG. 1, it will be noted that if the current applied to the base of transistor 1 is such as to place the transistor in the conducting state while the diode 4 is still conducting, the resultant circuit load is low. The load line is therefore essentially represented by line 8. The applied control current $I_p$ may thus give rise to a collector current and consequently to a very high emitter current $I_T$. However, each variation of current $I_T$ gives rise to an inductive voltage drop in the inductance 3 as determined by $V = L \, (di/dt)$, where L is the inductance value of inductance 3 and $di/dt$ is the variation of instantaneous current, i.e. the derivative of the current with respect to time.

The aforesaid voltage V is applied between the base and the emitter of transistor 2. If this voltage reaches the threshold value at which transistor 2 becomes conductive, (for silicon transistors this value if of the order of 0.7 to 0.8 volt), driving current $I_p$ is discharged through transistor 2 into diode 4 such that the base current of transistor 1 is substantially reduced. Consequently, the collector current i.e., the current which flows through inductance 3 (without consideration of the negligible base current), remains at a limited value.

Therefore, at instant $t_1$ current $I_T$ can increase with the rising edge of the waveform, which cannot exceed the value $dI_T/dt = V_{BES}/1$, where $V_{BES}$ is the threshold value of the value of the voltage $V_{BE}$ which renders transistor 2 conductive.

The maximum value of current $I_T$ which occurs is thus determined by the product of the non-conductive time (block time) of diode 4 and of the entity of said rising edge. Therefore, by assigning a suitable value to inductance 3, it is possible to control the current peak which takes place at the beginning in such a way that it will not exceed the normal operating values of transistor 1.

For purposes of example only and without limitation, let it be assumed that the power stage of a switching power supply which makes use of the present invention must deliver 5 amperes. Such a power stage is characterized by the fact that, when the power switching transistor switches from the non-conductive to the conductive state, the peak current that flows through this transistor is about 5 amperes with a rising edge of 500 nsec. By contrast, the power stage of prior art switching power supplies, which must deliver 5 amperes when switching from the non-conductive to the conductive state, has a peak transistor current of the order of 20 ampere with a rising edge of about 100 nsec.

From the foregoing discussion, the advantages of the dynamic current limiting circuit, which is the subject matter of the present invention, will be evident for use in a voltage switching regulator. In particular, the invention finds applicability where the power switching transistor must not pass excessive current for a finite time period. As a consequence, the risk of equipment malfunction or of a shortened transistor life cycle, is reduced to a minimum. Further, the primary power supply of the circuit is not required to withstand excessive short circuit currents and therefore the noise on the rest of the system due to such excessive currents is reduced or eliminated.

It will be apparent from the foregoing discussion that the invention is not limited to the preferred embodiment described and illustrated and that many variants, changes and modifications may be used, (e.g. the substitution of transistors of the NPN type for others of the PNP type), without departing from the principles and the spirit of the invention, as defined by the appended claims.

What is claimed is:

1. A dynamic current limiting circuit for a power supply, said power supply comprising a power switching transistor including a collector, a base and an emitter; a catch diode including an anode and a cathode; and an accumulator filter including capacitor and inductance means connected in parallel with said diode; said current limiting circuit comprising a feed-back transistor including collector, base and emitter elements; said collector element being connected to the base of said power switching transistor; said emitter element being connected to the cathode of said diode; said base element being connected to the emitter of said power switching transistor; and a feed-back inductance connected between said base and emitter elements of said feed-back transistor.

2. A regulating circuit for a power supply comprising a switching transistor having a collector coupled to one terminal of said power supply, the other terminal of said power supply being coupled to a reference point, means for applying current pulses to the base of said switching transistor, a feedback transistor having its base and emitter coupled respectively to the emitter and base of said switching transistor, an inductance coupled between the base and emitter of said feedback transistor, a commutating diode coupled across the terminals of said power supply, a filter coupled across said diode and including an inductance and a capacitor connected in series with each other, and means for deriving a regulated voltage across said last recited capacitor.

* * * * *